United States Patent Office 2,696,590
Patented Dec. 7, 1954

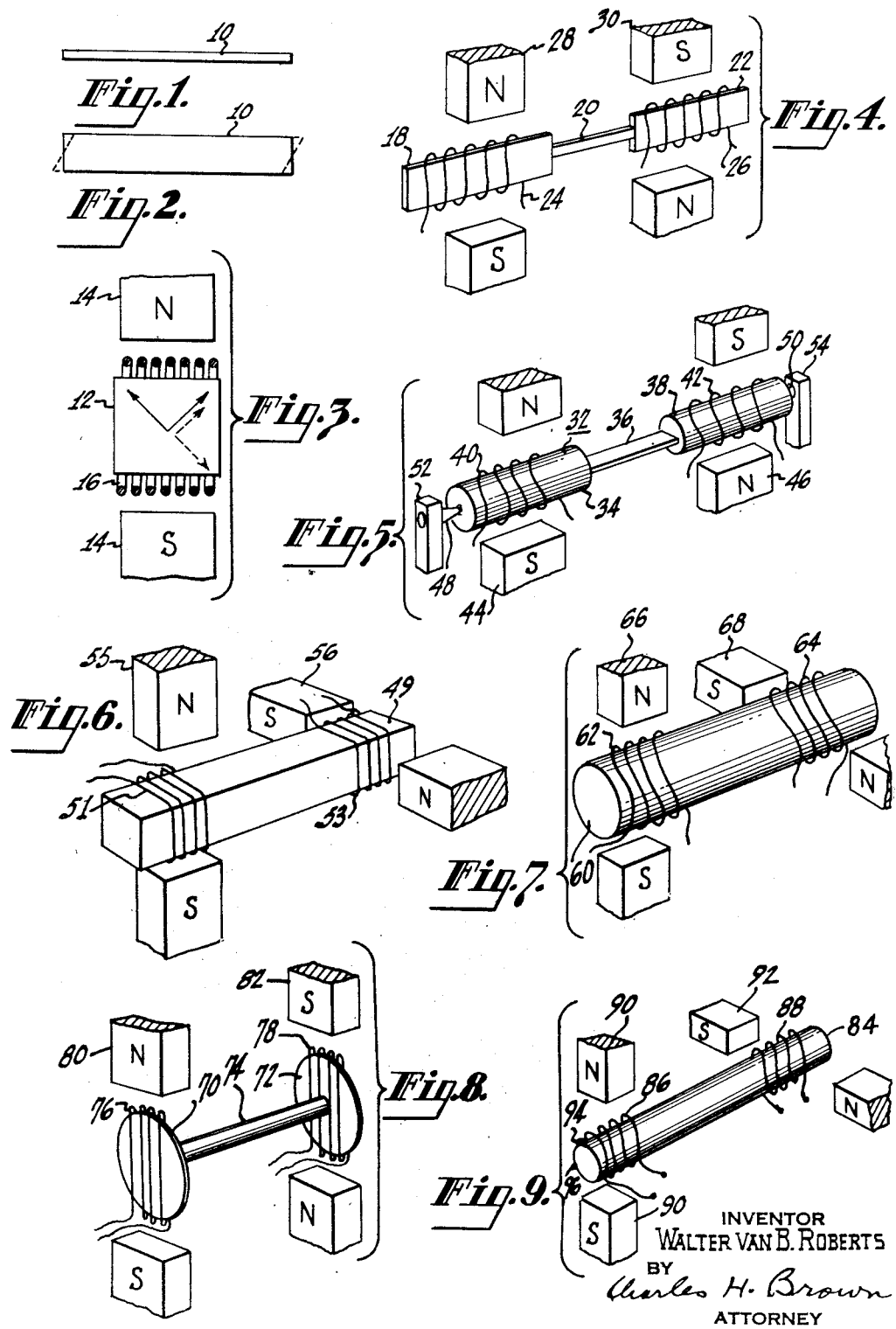

2,696,590

MAGNETOSTRICTIVE FILTER DEVICE

Walter van B. Roberts, Princeton, N. J., assignor to Radio Corporation of America, a corporation of Delaware Application June 28, 1951, Serial No. 234,133

2 Claims. (Cl. 333—71)

This invention relates to electro-mechanical wave filters and more particularly to magnetostrictively driven electro-mechanical wave filters.

In a Patent No. 2,501,488, issued to R. Adler for a "Magnetostrictively Driven Mechanical Wave Filter," there is shown and described an electro-mechanical wave filter which is magnetostrictively driven in shear. The filter consists of a plurality of vibratory elements comprising thin flat sheets of material with small elements coupling these in an iterative chain. The end sections, which are also thin flat sheets of material, are made to be magnetostrictively responsive. Shear driven filters can provide filter structures not easily attainable with other driving modes.

It is an object of this invention to provide an improved magnetostrictively driven electro-mechanical filter employing shear which, with a single resonator body and a single input and a single output, provides the results obtainable only with more complex filter structures.

Another object of this invention is to provide an improved magnetostrictively driven electro-mechanical filter employing shear which has a sturdy structure.

Still another object of this invention is to provide a simple and novel magnetostrictively driven electro-mechanical filter employing the shear mode of vibration.

Yet another object of this invention is to provide an improved magnetostrictively driven electro-mechanical filter employing shear which has an adjustable bandwidth.

These and other objects of my invention are achieved by providing an electro-mechanical filter having a magnetostrictively responsive vibrator. The vibrator is driven in the shear mode. The shape of the vibrator or the shape of the coupling between input and output sections of the vibrator may be varied to have a plurality of resonant frequencies and in order to obtain desired results. Furthermore, the orientation of a polarizing flux field for an output section of the vibrator may be positioned displaced at 90° with respect to an input polarizing flux field in order to obtain a sharp bandpass filter.

The novel features of the invention, as well as the invention itself, both as to its organization and method of operation, will best be understood from the following description, when read in connection with the accompanying drawings, in which Figure 1 is a plan view of a flat strip vibrator, Figure 2 is an elevation view of Figure 1 showing the deformation when vibrated in the shear mode, Figure 3 is a plan view of a square strip being excited in the shear mode, Figure 4 shows, in perspective, a single section filter using flat strip resonators operated in the shear mode, Figure 5 shows a perspective view of an adjustable bandwidth, shear mode operated filter using cylindrical resonators, Figure 6 is a perspective view of a differential filter driven in the shear mode, Figure 7 is a perspective view of another differential filter driven in the shear mode, Figure 8 is a perspective view of a disc type filter, and Figure 9 is a perspective view of a shear driven filter which provides the same results as are provided by three tuned, coupled circuits.

Figure 1 is a plan view and Figure 2 is an elevational view of a long, flat strip vibrator. In Fig. 2, the dotted lines show the shape at the ends of one extremity of displacement when the strip vibrator 10 is driven in simple shear. This is an idealized representation in which all parts of the strip suffer an equal and purely shearing strain when the vibrator is driven in shear mode. Actually, such a mode of vibration is not possible as it would have angular momentum. Bending vibrations therefore automatically come into play, which keeps the angular momentum zero. However, for certain ratios of length to width, the centers of the ends are stationary so that at these ratios the motion at the ends is substantially as shown in Fig. 2. The lowest of these ratios in aluminum, plated to be magnetostrictively responsive, is about 3¼ and the next about 4.95.

Figure 3 is a plan view of a thin square of metal 12 which is driven in the shear mode magnetostrictively. The permanent magnets 14 are arranged to produce a field which is at right angles to the field produced by the coil 16 shown in section. The solid arrows drawn on the square of metal are representative of the components of the magnetic field along directions at 45° to the coil axis. The dotted arrows represent components of the field produced by the coil along these same directions. It may be seen that along one of these directions the coil field adds to that of the magnet, while along other of the directions it opposes. Accordingly, one diagonal of the square is increased while the other is equally decreased. By definition this constitutes a pure shearing strain of the square. It has been found experimentally that the resonant frequency of a square driven in the shear mode in this manner (for aluminum which is nickel-plated to be magnetostrictively responsive) is approximately 75.5 kc. divided by the side of the square in inches. For a very long, narrow strip the width of the strip can be considered as a half-wave for shear wave velocity, namely, about 3.15 times $10^5$ centimeters per second. Hence the frequency for the simple shear mode shown in Fig. 2 is approximately 157 kc. divided by the width in centimeters, or 62 kc. divided by the width in inches.

It has also been found that nickel-plated aluminum cylinders may be driven in the shear mode by the same cross-field arrangement as shown in Fig. 3. The frequency of a cylinder is, however, greater than that of a strip having a width the same as the cylinder diameter, by about 15 percent.

As has been indicated, the foregoing description of the shear vibration of a long strip or cylinder has been idealized. Actually, for a given ratio of length to transverse dimension, a number of resonant frequencies are observed, but the important thing is that the responses are found in the region of the frequencies given by the above simple theory which can be excited by a coil extending a considerable length along the strip or cylinder. This has an advantage over the usual resonator driven in the longitudinal mode, since, at frequencies as high as the order of half a megacycle or more, the wave length is so small that a driving coil is likely to excite adjacent half waves of the material, if the resonator is more than one half wavelength, thus tending to nullify the desired driving effect. The shear mode resonator, however, can operate at a relatively high frequency without this difficulty occurring because the frequency depends primarily on the width of the resonator rather than its length.

Another important feature of the shear mode is that, from the simple configuration of Fig. 2, it may be seen that a neck connecting two identical shear resonators constitutes a relatively weak coupling. Thus, referring to Fig. 4, a pair of flat strip resonators 18, 22 are connected by a neck 20 to form a single section filter. A driving coil is around an input section of the resonator and a pickup coil is over the output section of the resonator. Although the resonators 18, 22 shown in Fig. 4 are flat strip material, it is to be understood that they may also be cylindrical material of the same width with a difference in shear resonant frequency which is higher than the flat strip material by about 15 percent. Magnets 28, 30 are respectively positioned over the input coil 24 and the output coil 26 so that the input section of the filter is driven in shear and the voltages induced in the coil magnetically associated with the output section are those as a result of the shear vibrations in the output section. The coupling section 20 constitutes a weak coupling means between the two sections of the filter and accordingly the band width of frequencies which may be passed by the filter is reduced. To illustrate this action, a ferrite strip 5.7 centimeters long by .32 centimeter wide had notches ground on each side at its center. Although the notches extended inward less than .1 centimeter, a pass band of only two-thirds percent at 573 kc. was obtained. Filters of more than two resonant elements may be made by putting coupling necks between adjacent resonators in similar fashion.

From the above explanation it may be seen that, by adjusting the plane of a coupling neck between two resonators which are excited in the shear mode, dependent on whether the plane of the coupling neck is in the plane of the shear vibration or at an angle to it, the width of the frequency band transmitted may be determined. The structure for this type of filter is shown in Fig. 5. There is shown a vibrator 32 having an input section 34 which is cylindrical and an output section 38 which is cylindrical. The coupling between the two resonators is in the form of a web or thin rectangle of the material. A driving coil 40 is positioned over the input section 34 to be magnetically associated therewith and a pickup coil 42 is positioned over the output section 38 to be magnetically associated therewith. Magnets 44, 46 are respectively positioned to provide a polarizing magnetic flux through the input and output sections which pass through these respective sections in the plane of the turns of the respective coils 40, 42. The vibrator 32 is supported at both extremities to be rotatable by two bearings 48, 50 which are attached to posts 52, 54 and hold the filter structure by contacting it exactly at the center of the end surfaces. These points do not have any motion when the resonator is excited in shear and has suitable proportions. The coupling effect presented in this filter between the input and output sections is different dependent upon whether the axis of the shear is in, or is perpendicular to, the plane of the web. For example, a pair of brass cylinders each one-fourth inch in diameter by three-eighths of an inch long were connected by a web 1.3 centimeters thick, .101 inch long and one-fourth inch wide. With the assembly oriented so that the web was not in the plane of the shear vibration, the pass band was from 183 to 184 kilocycles. By simply rotating the filter 90° on its own axis, the pass band became 182 to 194 kilocycles. By using an appropriate ratio of width to thickness in the coupling web 36 the two bands can be made as much or as little different as desired. To change bands it is only necessary to rotate the filter a one-quarter turn. There is thus provided an adjustable bandwidth filter.

Another application of the shear mode is in a differential filter, by which term is meant a filter in which signals are transmitted over parallel resonant paths and the outputs of each of these paths are combined differentially. Such a filter is described and claimed in an application by this applicant, Serial No. 76,586, filed February 15, 1949, for "Improvement in Filters," now U. S. Patent No. 2,631,193 issued on March 10, 1953. By the use of shear vibrations such a filter can be made with only a single resonator body and a single input and single output coil. An arrangement for this is shown in Fig. 6. A rod 49 of magnetostrictively responsive material which is approximately square constitutes the resonator. An input coil 51 is over and magnetically associated with its input section and an ouput coil 53 is over and magnetically associated with its output section. A polarizing magnetic field is provided by a magnet 55 at its input section. The direction of this field is along one diagonal of the cross-section of the vibrator rod. A polarizing magnetic field is also provided at the resonator output section by another magnet 56 which is positioned so that the direction of the magnetic flux passes through the output section along the other diagonal of the rod. A grounded shield (not shown) may be provided between the input and output sections to isolate the fields from the input and output section.

The input polarizing magnetic field can be considered as composed of two components each normal to a side of the rod. One of these components in conjunction with the input or driving coil sets up shear vibrations of the whole rod, the vibrations having a certain shear axis. The other component of this field sets up similar vibrations but with their shear axis at right angles to that of the first mentioned ones. These two shear vibrations are quite independent of each other and are of slightly different frequencies, since the rod is not quite square. At the output end of the vibrator each shear vibration cooperates with a component of the polarizing magnetic field present there to produce voltages in the output or pickup coil 53. If the output polarizing field were parallel to the input magnetic field, the two voltages caused by the two field vibrations would be numerically additive at frequencies above and below both the resonant frequencies of the rod 49. However, by orienting the magnetic field through the output section of the resonator 49 substantially at right angles to the field provided at the input section, the voltages induced in the output coil buck each other except in the pass band, which is the band between the two resonant frequencies of the rod. For the shear mode of operation it must be remembered the resonant frequencies are determined by the dimensions of the sides of the vibrator. The response outside the pass band may be adjusted to a minimum by a slight adjustment of the relative orientation of the magnets.

Referring now to Fig. 7, there is shown a nearly circular cylinder 60 which provides the same results, namely, those of a differential filter, as may be obtained from the filter shown in Fig. 6. In Fig. 7 the vibrator 60 is approximately circular, the input section has a driving coil 62 over it and magnet 66 is used to provide the polarizing flux. The direction of the polarizing flux at the input section of the resonator is half way between the axis of the resonator 60. The output section of the resonator also has a pickup coil 64 around it and the polarizing flux is provided by a magnet 68. The direction of this flux is along the axis which is substantially at right angles to the axis of the direction of the flux in the input section.

Referring now to Fig. 8, there is shown a filter wherein the shear vibrations are excited in a disc by the same cross field method described previously. The filter consists of two discs 70, 72 respectively serving as an input and an output section joined axially by a rod 74. A driving coil 76 is positioned over the input disc 70 and a pickup coil 78 is positioned over the output disc 72. Magnets 80, 82 are respectively placed over input and output discs 70, 72 to apply magnetic flux through them in the directions along the plane through the turns of the respective coils 76, 78. When the driver coil 76 is excited, the disc 70 at the input section is distorted into an elliptical shape, first with its long axis at 45° to the applied fields, then with its short axis at 45° to the applied field, etc. As an illustration, for an aluminum disc this frequency of distortion is approximately 91 kc. divided by the diameter in inches, and is independent of length. This vibration has no axial motion, so that a pair of discs coupled by a thin, axial neck, as is shown in Figure 8, gives a very narrow band, since this type of distortion is not well transmitted by a neck smaller than the discs. This fact is even more true for higher orders of this pure shear mode; that is, distortions involving more than two points at which the disc radius increases beyond normal at the same instant. The frequencies of these orders are given by the values of $x$ which make $J_n(x)/x$ an extremum, where $x$ is the angular frequency times the radius divided by the shear wave velocity of the material and $J_n$ is the $n$th order Bessel function of the first kind. For $n=2, 3, 4, 5, 6$ the values of $x$ are 2.30, 3.61, 4.81, 5.96 and 7.09. The lowest frequency (elliptical shape) is given by $n=2$, the three leaf clover shape by $n=3$, etc. Any of these orders can be excited by the cross field method, although the best form of winding and magnet structure are less simple when $n>2$.

In Fig. 2, the motion shown is not coupled to longitudinal modes. However, if a small mass were attached to the upper right corner of the vibrator, for example, the forces required to accelerate this mass also act as a driving force for longitudinal vibrations. Accordingly, if the length of the vibrator is chosen to make a longitudinal frequency coincide with a shear frequency, the effect of a pair of loosely coupled resonators is obtained.

Referring now to Fig. 9, there is shown a rod vibrator 84 with a driving coil 86 for its input section and a pickup coil 88 for its output section. The polarizing flux at the input section is provided by the magnet 90 positioned over the driving coil 86. A polarizing flux at the output section is provided by the magnet 92 positioned so that the direction of the flux through the output section is at right angles to the direction of the flux at the input section. A small mass 94 is attached to one end of the vibrator at the diameter which is in the same direction as the polarizing flux passing through the input section. Choosing the length of the resonator 84 so that its longitudinal frequency coincides with the shear frequency, the effect of a pair of loosely coupled resonators is obtained and longitudinal vibrations are set up. Attaching a small mass 96 at a point 90° around the axis of the resonator from the first mass 94, then the longitudinal vibrations set up as a result of the first mass have the effect, as a result of a second mass being present, of setting up shear forces with an axis at right angles to the original shear forces. If the resonator 84 is exactly square or round, the last named resonance will occur at the same frequency as the driving resonance. The effect is that of three coupled circuits. The voltages excited in the pickup coil 88 are thus responsive to the shear vibrations caused by the second mass 96.

To recapitulate, the input section of the resonator is driven in shear with vibrations having one orientation. These are coupled to longitudinal vibrations by means of the first mass. Responsive to these longitudinal vibrations the second mass provides shear vibrations having an orientation at right angles to the input shear vibrations. The positioning of the output polarizing magnets insures a response to the last named shear vibrations only. The overall transmission is thus the same as for three separate resonators.

The masses 94, 96 are small when compared to the mass of the resonator 84. However, this coupling may also be produced by using negative masses (i. e., notches in the material). The notches must be accurately at 90° points to avoid coupling the two different direction shear vibrations together, except by way of the longitudinal vibrations which serve to couple them. However, a single mass or notch may be put half way between the locations shown and will serve to provide both couplings. If it is not exactly half way between, the couplings will be unequal. Either mass or notch can be at either end of the rods, or smaller masses or notches can be put at both ends. Small holes in the centers of the ends may be drilled to raise the longitudinal frequency, or small masses added to reduce it, for tuning.

There has been shown and described herein an improved electro-mechanical filter operating in the shear mode, wherein a single resonator body with a single input and output provides results which heretofore have been obtainable only with more complex filter structures. The novel shear mode operated filters shown and described are sturdy and provide, merely by moving or rotating the filter 90°, a means for controlling the band width of the filter.

What is claimed is:
1. An electro-mechanical, variable width bandpass filter comprising a magnetostrictive vibrator having a rod-shaped input section, a rod-shaped output section and a rectangular shaped web coupling said input and output sections, a driver winding positioned over said input section to be magnetically associated therewith, a pickup winding positioned over said output section to be magnetically associated therewith, means to support said vibrator to be rotatable within said driver and pickup windings, means to apply polarizing magnetic flux through said input section in a plane substantially parallel to the plane of the turns of said driver winding, and means to apply polarizing magnetic flux through said output section in a plane substantially parallel to the plane of the turns of said pickup winding whereby a maximum frequency bandwidth is passed when said web is positioned at right angles to the direction of the application of polarizing flux and a minimum frequency bandwidth is passed when said web is positioned in the same direction as said polarizing flux.

2. An electro-mechanical filter comprising an elongated magnetostrictive element having an input section, an output section and an intermediate section coupling said input and output sections, said intermediate section having a cross section which has a greater dimension in a first direction than in a second direction at right angles thereto, a driver coil around said input section and an output coil around said output section, means to apply polarizing magnetic fluxes transversely through said input and output sections, and means supporting said elongated magnetostrictive element and enabling rotation on its longitudinal axis.

References Cited in the file of this patent

UNITED STATES PATENTS

| Number | Name | Date |
|---|---|---|
| 2,112,560 | Davies | Mar. 29, 1938 |
| 2,184,321 | Soller | Dec. 26, 1939 |
| 2,401,094 | Nicholson | May 28, 1946 |
| 2,501,488 | Adler | Mar. 21, 1950 |
| 2,670,460 | Gilbert | Feb. 23, 1954 |

FOREIGN PATENTS

| Number | Country | Date |
|---|---|---|
| 363,848 | Italy | Oct. 14, 1938 |

OTHER REFERENCES

Roberts et al., RCA Review, September 1949, pp. 348–365.